(12) United States Patent
So et al.

(10) Patent No.: US 12,348,620 B2
(45) Date of Patent: *Jul. 1, 2025

(54) METHOD AND APPARATUS FOR TWO-STEP DATA SIGNING

(71) Applicant: ARRIS Enterprises LLC, Suwanee, GA (US)

(72) Inventors: Nicol C. P. So, Newtown, PA (US); Alexander Medvinsky, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,128

(22) Filed: Oct. 3, 2023

(65) Prior Publication Data

US 2024/0146516 A1     May 2, 2024

Related U.S. Application Data

(63) Continuation of application No. 17/953,778, filed on Sep. 27, 2022, now Pat. No. 11,777,721.

(Continued)

(51) Int. Cl.
*H04L 9/08*     (2006.01)
*H04L 9/30*     (2006.01)
*H04L 9/32*     (2006.01)

(52) U.S. Cl.
CPC .......... *H04L 9/085* (2013.01); *H04L 9/3073* (2013.01); *H04L 9/3249* (2013.01); *H04L 9/3268* (2013.01)

(58) Field of Classification Search
CPC ....................................................... H04L 9/085
See application file for complete search history.

(56) References Cited

U.S. PATENT DOCUMENTS 5,905,799 A    5/1999   Ganesan
8,589,693 B2   11/2013   Barthelemy et al.
(Continued)

FOREIGN PATENT DOCUMENTS

EP           0872080 A1     10/1998

OTHER PUBLICATIONS

Bellare, M., et al., "The Security of Practical Two-Party RSA Signature Schemes", Dept. of Computer Science & Engineering, University of California at San Diego, Jan. 2001, pp. 1-26.

(Continued)

*Primary Examiner* — Bradley W Holder
(74) *Attorney, Agent, or Firm* — Chernoff, Vilhauer, McClung & Stenzel, LLP

(57) ABSTRACT

A system and method for signing data is presented. In one embodiment, the method comprises: generating a data signing key; transforming the data signing key into a first subkey and a second subkey; encrypting the first subkey according to a secret key of an ODSS; generating a signature verification public key; providing the signature verification public key, the encrypted first subkey, and the second subkey for storage in a client device; accepting a request to sign the data, the request having a representation of the data and the encrypted first subkey; generating a partially computed signature of the data according to the representation of the data and the encrypted first subkey; and providing the partially computed signature of the data to the client device.

20 Claims, 10 Drawing Sheets

Related U.S. Application Data

(60) Provisional application No. 63/248,954, filed on Sep. 27, 2021.

(56) References Cited

U.S. PATENT DOCUMENTS

| | | | |
|---|---|---|---|
| 9,906,505 | B2 | 2/2018 | Peeters et al. |
| 2008/0109466 | A1* | 5/2008 | Havens ............... G06F 9/45537 707/999.102 |
| 2011/0264917 | A1 | 10/2011 | Barthelemy et al. |
| 2016/0365981 | A1 | 12/2016 | Medvinsky et al. |
| 2018/0109372 | A1* | 4/2018 | Fu ........................ H04L 9/083 |
| 2019/0288834 | A1* | 9/2019 | Black ................... H04L 9/0822 |
| 2021/0399886 | A1* | 12/2021 | Dhanabalan .......... G06F 16/176 |

OTHER PUBLICATIONS

Boneh, D., et al., "Efficient generation of shared RSA keys", Journal of the ACM (JACM), Jul. 2001, pp. 702-722, vol. 48, Issue 4.

Hallam-Baker Thresholdsecrets Com P M: "Threshold Signatures in Elliptic Curves; draft-hallambaker-threshold-sigs-05.txt", Threshold Signatures in Elliptic Curves; Nov. 2, 2020, pp. 1-30, XP015142608, Retrieved from the Internet: URL:https://tools.ietf.org/html/draft-hallambaker-threshold-sigs-05 [retrieved on Nov. 2, 2020].

Office Action in European Patent Application No. 22197528.7-1218, dated Feb. 17, 2023.

\* cited by examiner

METHOD AND APPARATUS FOR TWO-STEP DATA SIGNING

CROSS-REFERENCE TO RELATED APPLICATIONS

The present application is a continuation of U.S. patent application Ser. No. 17/953,778 filed Sep. 27, 2022, which claims priority to U.S. Provisional App. No. 63/248,954 filed Sep. 27, 2021, the contents of which are each incorporated herein by reference in their entirety.

BACKGROUND

1. Field

The present invention relates to systems and methods for signing data for use on devices, and in particular to a system and method for enhancing the security of digital signature generation.

2. Description of the Related Art

It is beneficial in some circumstances to provide data to devices which have already been distributed to end users (e.g. fielded devices). Such data may be needed to update the device(s) to newer configurations or to perform additional functions, to ameliorate software "bugs" or other issues, or to simply replace data already resident in the device that may have been compromised. Such data may include software instructions (e.g. code) update fielded devices by providing data such as software code to those devices remotely.

One of the problems with the remote downloading of such data to fielded devices is that the data may be from an unauthorized source. An entity providing the data to the fielded devices may pose as a legitimate source of the data, yet provide data that is designed to compromise the security or functionality of the device. For example, the user of the device may be misled into believing that their device needs a software update in order to function properly, and may be provided a bogus uniform resource location (URL) from which to download the software update. If the user downloads and installs the software update from the bogus URL, the code that is actually downloaded may include a virus or other malware that negatively affects the operation of the device, perhaps compromising all of the data (including the user's private information) that was stored by the device before the infected.

To prevent the foregoing problems, code signing techniques can be used to digitally sign data such as executables and scripts. Such signatures confirm the identity of the author of the data and guarantee that the data has not been altered or otherwise corrupted since it was signed. Most code signing paradigms provide a digital signature mechanism to verify the identity of the author of the data or build system, and a checksum to verify that the data object has not been modified. Such code signing paradigms typically use authentication mechanisms such as public key infrastructure (PKI) technologies, which rely on data publishers securing their private keys against unauthorized access. The public key used to authenticate the data signature should be traceable back to a trusted root certificate authority (CA). If the data signature is traced to a CA that the device user trusts, the user is presumed to be able to trust the legitimacy and authorship of the data that is signed with a key generated by that CA.

Systems for code signing are known in the art. Such systems provide a framework that allows different organizations or companies to structure their data signing permission needs as they see fit or to safely permit data signing by other independent organizations.

In digital signature generation using public key cryptography, each person or entity that may digitally sign documents owns a public-private key pair. The private key is kept private (i.e. undisclosed) by the owner (signer); the public key is used by others to verify digital signatures generated by the signer using the signer's private key. In some settings, that the private key exists as a single piece of data and possessed by one party, which poses risks. One risk is the loss of confidentiality of the private key. Often, the owner of a key pair performs signing operations on a general-purpose computing device such as a personal computer, and the private key is kept on the device to allow convenient access to the signing key. If the security of the device is somehow compromised, the private signing key may be disclosed to and used by others to forge digital signatures of the owner.

In other settings, a person entrusted with exercising a private key to generate digital signatures is not the owner of the key. The person may be an employee, officer, or agent acting on behalf of an organization. The organization may want to ensure signature generation using the organization's private key necessarily involve more than one party or entity.

What is needed is a system and method for signing software images and other information that enhances the security of the private key.

SUMMARY

To address the requirements described above, this document discloses a system and method for signing data. In one embodiment, the method comprises: generating a data signing key; transforming the data signing key into a first subkey and a second subkey; encrypting the first subkey according to a secret key of an online data signing service (ODSS); generating a signature verification public key; providing the signature verification public key, the encrypted first subkey, and the second subkey for storage in a client device; accepting a request to sign the data, the request having a representation of the data and the encrypted first subkey; generating a partially computed signature of the data according to the representation of the data and the encrypted first subkey; providing the partially computed signature of the data to the client device; and computing a full signature on the client after performing additional computation with the second subkey.

Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

Figure 1:
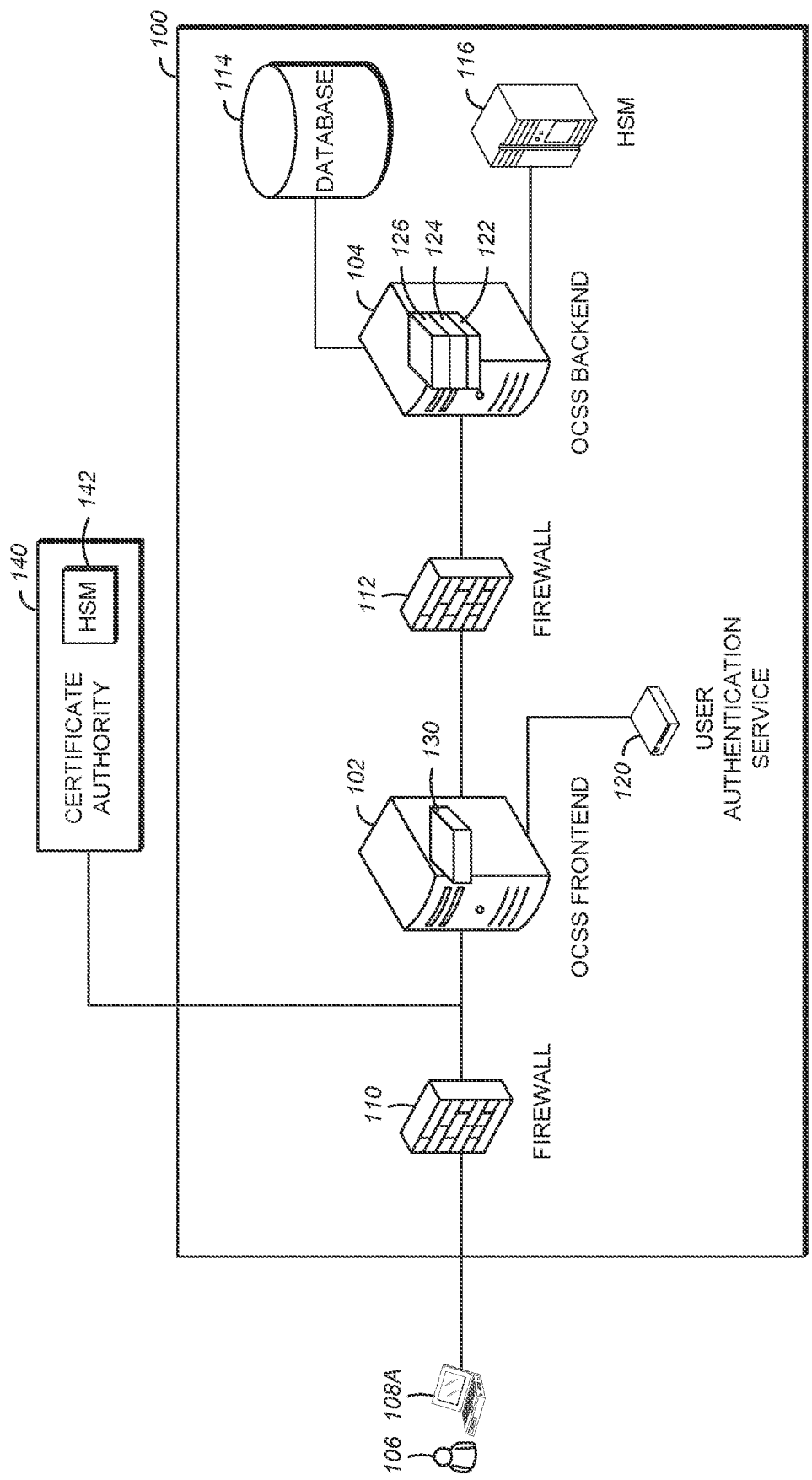
FIG. 1 is a diagram depicting one embodiment of an online code signing system (OCSS)

In the following description, reference is made to the accompanying drawings which form a part hereof, and which is shown, by way of illustration, several embodiments. It is understood that other embodiments may be utilized and structural changes may be made without departing from the scope of the present disclosure.

Overview

Disclosed below is an online data signing system (ODSS) that supports standard data signing formats such as those defined by Public Key Cryptography Standards PKCS #1, PKCS #7, and other proprietary signing mechanisms. The ODSS also optionally performs operations such as data encryption and decryption. Although the principles of this disclosure can be applied to signing any data (or any portion or piece of a particular data structure), for purposes of illustration, the description that follows refers to a useful embodiment of the ODSS, namely that of an online code signing service (OCSS), that is used to sign software code.

The OCSS offers a web portal for users to login and sign code images or other types of digital objects, generate digital signatures, encrypt code, and/or decrypt code manually and a web service interface for machine clients to do so programmatically. In order to provide such an automatic mechanism to sign code, a machine-to-machine interface is provided over the Internet such that the Client/User machine can automatically connect with the OCSS to request code signing. The OCSS utilizes an architecture which consists of a client application, an OCSS frontend (front-end server), and an OCSS backend (back-end server).

In the two step signing system, the private key of a key pair used for digital signature is split into two parts (also called "shares" or "subkeys"). The normal computational process of generating a signature using the private key is carried out as a two-step process instead, each requiring the use of one of the shares.

In the case of RSA digital signature, the private key d is used in a modular exponentiation: $m^d$ mod n, where m is the result of preprocessing the document to be signed and is the immediate input to the RSA operation, d is the secret/private RSA exponent and n is called a modulus which is a product of two large prime numbers. Note that m may be the result of applying a one-way hash function to the data to the signed, and applying padding and other formatting operations.

An RSA private exponent d may be split into two parts (subkeys) s1 and s2 additively or multiplicatively. With additive splitting, $d \equiv s1+s2 \pmod{\varphi(n)}$, where $\varphi$ is Euler's totient function, and $\equiv$ denotes modular congruence. The expression $m^d$ mod n can alternatively be evaluated as $(m^{s1} \cdot m^{s2})$ mod n, which is equal to $((m^{s1} \bmod n) \cdot (m^{s2} \bmod n))$ mod n. With multiplicative splitting, s1 and s2 are chosen so that $d \equiv s1 \cdot s2 \pmod{\varphi(n)}$. The expression $m^d$ mod n can alternatively be evaluated as $(m^{s1})^{s2}$ mod n, which is equal to $(m^{s1} \bmod n)^{s2}$ mod n.

With both additive and multiplicative splitting, the process of choosing s1 and s2 should be such that knowledge of one will not make guessing the other substantially easier. One way to do this is to choose (s1, s2) randomly from among all pairs of values satisfying the constraint applicable to the type of splitting. Optionally both s1 and s2 may be constrained to meet minimum size requirements. For exponentiation modulo n, it suffices to consider only integer exponents in the range of $\{0, \ldots, \varphi(n)-1\}$, because any integer exponent greater than or equal to $\varphi(n)$ is equivalent to an exponent in the range. Let b be the number of bits needed to represent an arbitrary exponent in the range of $\{0, \ldots, \varphi(n)-1\}$. The sizes of s1 and s2, not counting leading zeroes, may be constrained to be in the range of $\{b-k, \ldots, b\}$ bits, for some $0 \leq k < b$. The choice of value of k determines the minimum size of s1 and s2. Enforcing this constraint is optional, but may be employed as a heuristic to defend against potential attacks involving exponents (s1 and s2) that are too small. The technique can be summarized in the steps of (1) key generation and splitting, and (2) signature generation.

Key Generation and Splitting: The client device requests a new data signing key. The Certificate Authority receives the request, generates a new (and private) data signing key, and splits the key into a first subkey s1 and a second subkey s2, as described above. The Certificate Authority also generates a signature verification public key, which may be included in a code signing key certificate that is returned to the client device. The second subkey s2 is returned to the client device, and may be encrypted according to a client device secret key before transmission for security purposes. The encryption protects the second subkey s2 while it is in transit. Either a symmetric-key or an asymmetric-key (i.e. public key) encryption algorithm can be used for the purpose. In one embodiment, the first subkey s1 is also returned to the client, but is encrypted according to an OCSS key (optionally securely stored in a hardware security module) unknown to the client device before transmission. This allows the first subkey to be stored in the client device without being exposed, so that the client device may return the encrypted first subkey to the OCSS when data signing is desired. This frees the OCSS from the need to store the first subkey associatively with the client device. Alternatively, the OCSS may simply store the first subkey associatively with a client device identifier and retrieve that first subkey when required, relieving the client device of the need to transmit the encrypted first subkey to the OCSS along with the data signing request.

When the client device wishes to sign data, a code signing request is transmitted to the OCSS. The code signing request comprises a representation (such as a digest) of the data. In embodiments where the first subkey is not stored in the OCSS, the request also comprises the encrypted first subkey, and may include the code signing key certificate. The OCSS then uses this information to generate a partially computed signature, and transmits the partially computed signature to the client device. Using the second subkey and the partially computed signature, the client device then computes the complete signature of the data.

If the client already has a key pair and a certificate (for example, in a key file) a client-side tool (for example, a tool provided by a Certificate Authority administrator to the client) can be used to extract the private key from the key file and split it into two halves. This step may involve having the user provide a password to unlock the key file. For an illustrative example, consider RSA signature and additive key splitting. The private exponent d is split into two shares s1 and s2 as described earlier. One share, s2, is kept locally by the client device (for example, as a new key file) and possibly protected with encryption and a password. The other share, s1, is uploaded to the OCSS. The upload may include other information, for example, the original certificate for the key pair. If the Certificate Authority is the originator of the client's key pair and the issuer of the associated digital certificate, the Certificate Authority already has the information needed to split the private exponent into two shares from the outset. The client will still be provided with the key pair and the certificate, but key splitting does not need to be performed on the client's side. If the Certificate Authority is the originator of the client's key pair, it will not keep a copy of the client's private key, or any equivalent data. This ensures that the customer has control of the ability to exercise the private key. To avoid having to store a secret for each customer, the Certificate Authority can generate an encrypted data structure {(s1, n)}_K_HSM, containing s1 and n and encrypted using a key K_HSM protected by a hardware security module (HSM) in the OCSS. The encrypted data structure may be provided to the client for storage, and will be submitted to the OCSS in subsequent signing operations. Alternatively, the OCSS can a maintain a record of (s1, n) for each client.)

Signature Generation: To generate a signature for a document T, the customer uses a client-side tool. The tool pre-processes T to yield message m, which is normally intended to be an immediate input to an RSA operation (i.e. modular exponentiation) using the customer's private exponent, d, and the public RSA modulus n. This kind of pre-processing is prescribed by standards, and typically involves applying a secure one-way hash function to T and applying padding and formatting. The output of applying a secure one-way hash function to T is commonly referred to as a digest of T. The client-side tool computes (m^s2 mod n) and keeps it for later use in the signing operation. Except for the modified exponent, this is very much like the RSA operation in a standard signing operation. The tool then uploads (m, {(s1, n)}_K_HSM) to the OCSS. This may involve the customer logging into an account with the OCSS. OCSS decrypts {(s1, n)}_K_HSM to recover s1 and n, and computes m^s1 mod n inside a secure environment, e.g. an HSM 116. The value of (m^s1 mod n) so computed is returned to the client-side tool operated by the customer. The client-side tool then computes the value of m^d mod n as ((m^s1 mod n)·(m^s2 mod n)) mod n. With this value, the client-side tool completes any remaining steps (e.g. bundling in additional information and formatting) to generate the final output, which may be a signed version of the document T, or a standalone ("detached") digital signature.

After the original private key d has been split into s1 and s2, the client-side tool does not need to use d in signature operations. The original private key can be removed from the client's computer if the private key originated there or was previously stored there. Therefore, if s2 is leaked, someone knowing its value cannot forge the client's signature with that knowledge alone. Also, because knowledge of s2 needs to be combined with knowledge of s1 in order to generate a valid signature, and because exercising s1 involves a secret kept in the OCSS, the OCSS can serve as a "choke point" for logging signature generation activities. Also, because the OCSS does not know a client's private key (or an equivalent of it), the OCSS cannot generate a valid signature on behalf of a customer without the client's involvement. This may allay certain conflict-of-interest concerns in some business situations.

FIG. 1 is a diagram depicting an exemplary OCSS 100. The OCSS frontend 102 is a Graphic User Interface (GUI) layer that is the presentation layer for the OCSS 100. The OCSS frontend 102 is hosted on a server that is behind a first firewall 110 to protect against unnecessary or unauthorized access. The OCSS frontend 102 comprises a web portal interface 130 that implements the presentation (e.g. "look and feel") of functionality of the OCSS 100 on the user device 108A to an external user 106. In one embodiment, the web portal interface 130 is hosted in an Internet Information Services (IIS), an extensible web server software product produced by Microsoft. Preferably but not necessarily, the OCSS frontend 102 is not relied on to enforce signing permissions, perform any signing or key generation activities, or define the hierarchy of the entities discussed below or how the access to such entities are managed. Rather, the OCSS frontend 102 controls access to the OCSS backend 104, and the OCSS backend 104 performs the functionality of enforcing signing permissions, performing signing or key generation activities, and/or defining the hierarchy of the entities discussed below and how the access to such entities are managed.

In order to support the two-step signing procedure, a Certificate Authority 140 requires enhanced functionality from that which is typically available. The Certificate Authority 140 depicted in FIG. 1 includes a Certificate Authority server/processor 144 and is capable of generating private keys that are split into two shares or subkeys s1 and s2 as well as the corresponding public key which is often included in a digital code-signing certificate signed by the same Certificate Authority 140. The generation of the code signing key and related public key, as well as the separation of that code signing key into first subkey s1 and second subkey s2 can be accomplished using secure HSM processing, server/processor processing, or a combination thereof.

Once the client device obtains such a split private key and corresponding public key or digital certificate, the client device is ready to request digital signatures that utilize the two-step signing procedure. The Certificate Authority 140 may include Certificate Authority Hardware Security Module (CA HSM) 142 which is used to enforce hardware security for use of any secret and private keys.

To access the Certificate Authority 140, clients may utilize a manual procedure with a request submitted over secure email or secure web portal. Alternatively, clients may implement an automated certificate enrollment protocol similar to Certificate Management Protocol (CMP) defined in IETF RFC 4210 (hereby incorporated by reference herein), however with the changes necessary to accommodate for split private keys.

The OCSS frontend 102 also has access to a server operating according to a user authentication service such as an Lightweight Directory Access Protocol (LDAP) server to authenticate valid user device 108A. The OCSS 100 maintains its own database of user 106 accounts, and the OCSS User authentication service 120 is used when a user is added to the system for the first time and a user account is created and stored in the OCSS database 114.

To access the OCSS 100, the user 106 must establish user credentials that can be used to authenticate the user to the OCSS. Examples of such credentials includes a password, a digital certificate (such as a TLS client certificate), and pre-shared parameters for generating time-based one-time passwords. Those credentials are used to validate every user session between the user and the OCSS frontend 102. The OCSS 100 forbids access to users 106 unless valid credentials are provided by the user device 108A and favorably compared to analogous information specified in OCSS database 114. Hence, only valid OCSS 100 users having credentials matching those stored in the OCSS database 114) are allowed to access OCSS 100.

The OCSS backend 104 is behind a second firewall 112 and provides protected access to the OCSS database 114 and the code signing keys that are stored in an OCSS hardware security module (HSM) 116. The OCSS backend 104 is used to access the OCSS hierarchical entities discussed below and to look up user permissions for different code signing configurations and to perform all authorized crypto operations. The OCSS backend 104 connects to OCSS HSM 116 and using the OCSS HSM 116, performs operations such as code signing, encryption, and decryption. The OCSS backend 104 may implement a plurality of software layers including, from the top software layer to the bottom software layer, an OCSS Service Layer 126, a Business Logic Layer (BLL) 122 and a Data Access Layer (DAL) 124.

Although the foregoing discloses an OCSS 100 having a OCSS frontend 102 and an OCSS backend 104, the OCSS 100 may be implemented with a single server performing the functions of both the OCSS frontend 102 and the OCSS backend 104, albeit, with reduced security.

The OCSS Service Layer 126 is the heart of OCSS 100 and comprises a plurality of signing/generation operations that are supported by OCSS 100. Depending on what type of service is needed, a specific dynamically loadable library (DLL) required for that service may be injected into memory to perform the operation.

The Business Logic Layer (BLL) 122 specifies which users 106 have access to the OCSS 100 and the conditions on which access is granted or revoked. The BLL 122 also takes care of other business logic such as updating audit logs and generating reports.

The Data Access Layer (DAL) 124 provides access to the OCSS database 114 and enables queries to access, add or remove entries in the OCSS database 114.

Manual Interactive Web Processes

Figure 2:
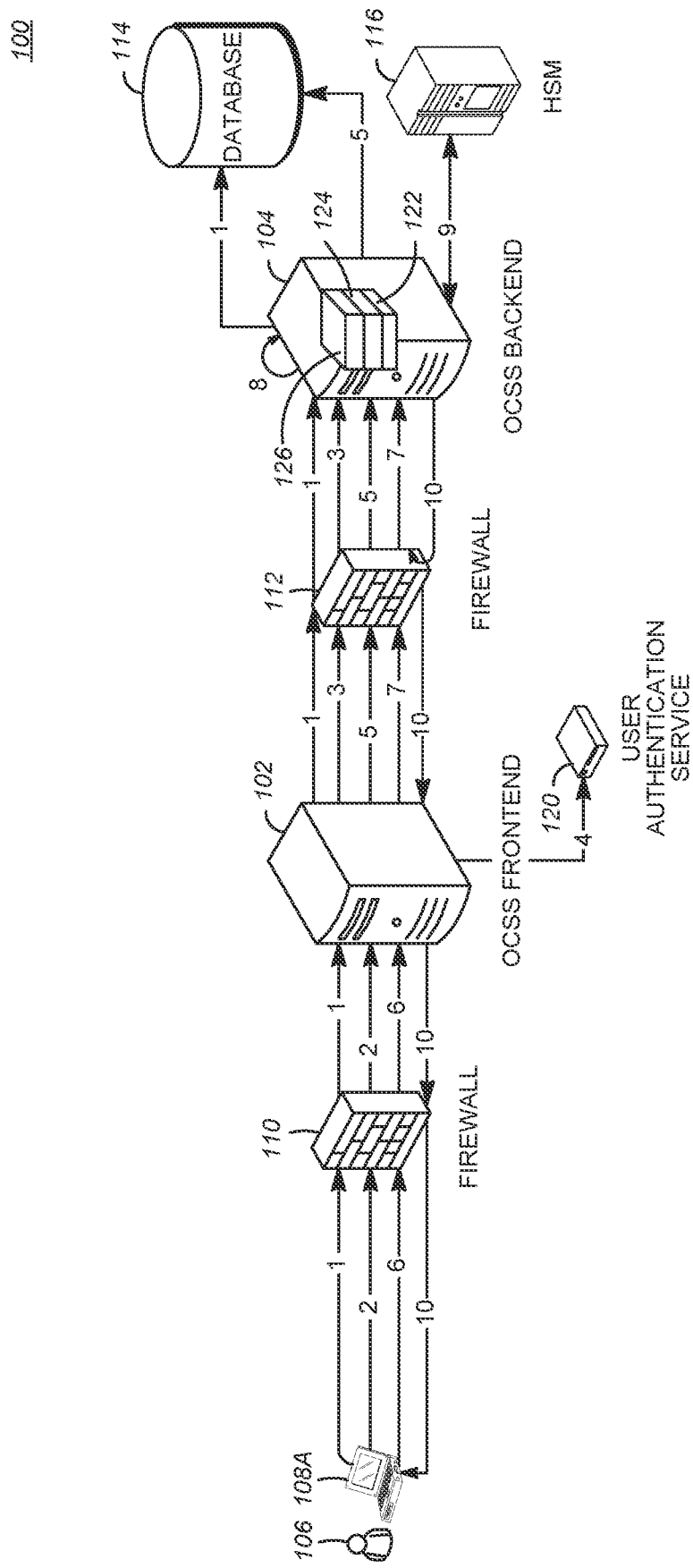
FIG. 2 is a diagram illustrating one embodiment of a manual process by which the designated users of the OCSS is used to sign data.

In a first embodiment, a manual code signing generation functionality is provided users 106. FIG. 2 is a diagram illustrating one embodiment of a manual process by which the designated human users of the OCSS 100 use to sign data.

Step 1: Before a user 106 can access the OCSS 100, an administrator of the OCSS 100 adds user's identity such as a username to the OCSS configurations (further described below) in OCSS database 114 corresponding to software development projects the user 106 has been assigned.

Step 2: The user 106 interacts with the OCSS frontend 102 via a web browser executing on a user device 108A (alternatively referred to hereinafter as an administrator client device). Preferably, this interaction is performed using the secure hypertext transfer protocol (HTTPS).

Step 3: The OCSS frontend 102 utilizes appropriate services provided by the OCSS backend 104 over a simple object access protocol (SOAP) interface.

Step 4: When the user 106 logs in, the OCSS frontend 102 validates the user credentials (e.g. username and password) received from the user device 108A against data stored in the OCSS User authentication service 120 and if the user credentials compare favorably with the data stored in the OCSS User authentication service 120, the user 106 is allowed to access the OCSS 100. If not, the user 106 is denied access to the OCSS 100.

Step 5: Based on logged in user's credential, the OCSS frontend 102 invokes BLL 122 of the OCSS backend 104 to look up user permissions to determine which configurations the logged in user has access to and presents only those configurations to the user 106.

Step 6: Using the user device 108A, the user 106 then selects one or more of the presented configurations and uploads an input/request file as well as other request parameters to OCSS frontend 102.

Step 7: The OCSS frontend 102 passes the uploaded input/request file, selected configuration, and operational details such as which signing key, signature algorithm, and/or digital signature format to use to OCSS backend 104.

Step 8: The OCSS backend 104, upon receiving request from the OCSS frontend 102, invokes the OCSS Service Layer 126.

Step 9: The invoked OCSS Service Layer 126 accesses the OCSS HSM 116 to get the keys that are needed to sign the data in the input/request file, and also retrieves configuration details from OCSS database 114. In one embodiment, the OCSS Service Layer 126 also parses the input file. This is required because for some signing operations, the input file has to follow a particular format, and this operation verifies that the input file is using the proper format, then retrieves certain information from certain portion(s) of input file. The OCSS Service Layer 126 then performs appropriate operations such as code signing, encryption, and decryption on the relevant portions of the input file. Based on these operations, the OCSS Service Layer 126 generates an output response file having the signed data and other information.

Step 10: The OCSS Service Layer 126 returns the generated output/response to the OCSS frontend 102. The OCSS frontend 102 generates a file from the generated output/response, which is forwarded to the user computer 108.

Automated Machine-to-Machine Interface

Another embodiment provides the automatic signing generation functionality to customers such that they can integrate this in their automated build process. In order to provide such a mechanism a machine-to-machine interface must be provided over the Internet such that OCSS machine user 108B can automatically connect with our OCSS 100 Service to request code signing. The OCSS system 100 has two types of users: human users 106 and machine users 108B. Both may have "user" role in the system, while only human user can have "manager" or administrator role. The machine to machine interface is for a OCSS machine user 108B to request code signing programmatically.

Figure 3:
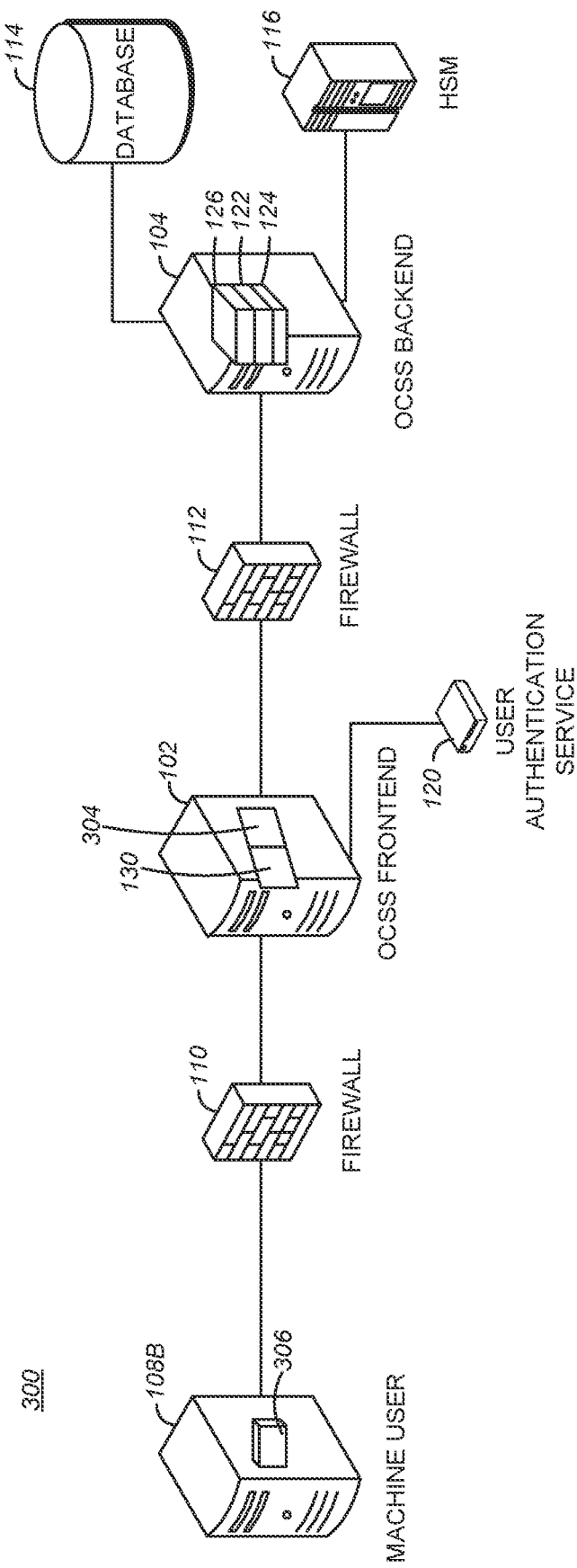
FIG. 3 is a diagram of an automated version of the OCSS.

FIG. 3 is a diagram of an automated version of the OCSS 100. As described below, the automated OCSS 300 uses same OCSS architecture depicted in FIG. 1, and can be used to support automated online requests from a OCSS machine user 108B associated with an IP address. In this case, the IP address is treated as a virtual user of the OCSS 100 and can obtain the same kinds of permissions as are normally assigned to a human user 106.

The automated OCSS 100 introduces two new components: an OCSS client tool 306 implemented on an OCSS machine user 108B and an OCSS Web service 304. The OCSS client tool 306 may be implemented in JAVA. The OCSS Web Service 304 provides an interface to the OCSS 100 infrastructure elements described above.

The automated OCSS 100 implements a machine-to-machine interface that comprises OCSS client tool 306, OCSS Web Service 304 and OCSS backend 104. OCSS backend 104 functionality is shared between the manual user access modes described with respect to FIG. 2 (e.g. graphical user interface or GUI), and the machine-to-machine interface described further below.

OCSS Client

The OCSS machine user 108B utilizes an OCSS client 306 that comprises an executable written in a general purpose programming language that can be executed in virtually any environment, such as JAVA.

The OCSS client 306 that is executed in the OCSS machine user 108B environment handles any pre-processing and post-processing of image files of the data to be signed so the OCSS machine user 108B does not need to know the details of the signing operations being performed on such data. The OCSS client 306 communicates with the OCSS Web Service 304 which runs on OCSS frontend 102.

OCSS Web Service

The OCSS web service 304 is hosted on OCSS frontend 102 behind first firewall 110 to protect against unauthorized access. The OCSS web service 304 can be hosted in IIS and performs authorization and authentication functionality of OCSS 100 and does not include system and other crypto operation details. The OCSS web service 304 allows the OCSS client, through the OCSS frontend 102 to request code signing, encryption and decryption without a human interface or user 106 involvement.

OCSS Machine-to-Machine Process

Before an OCSS machine user 108B can access OCSS 100, the OCSS administrator creates a user (machine) account in the OCSS User authentication service 120 and personalizes a hardware cryptographic token for that OCSS machine user 108B. The hardware cryptographic token can be used for OCSS machine user 108B authentication in a number of ways.

Once the OCSS machine user 108B is authenticated, the OCSS Web Service 304 invokes the OCSS backend 104 to retrieve machine authorization permission data that is used to determine whether the requesting machine account is authorized to perform the requested operation. Such authorization permission data is stored in the OCSS database 114.

Upon receiving the request from OCSS Web Service 304, the OCSS backend 104 invokes the OCSS Service Layer 126, which accesses the OCSS HSM 116 to retrieve the keys required for the data signing process and also retrieve configuration details for the configurations that the client is authorized to access or control. The OCSS backend 104 then optionally parses the input file provided by the OCSS machine user 108B above. The OCSS backend 104 then performs the appropriate action such as signing the code or other data in the input file, and/or encryption and decryption of data or keys. Based on the results of the action, the OCSS Service Layer 126 generates a response having the output or results of the requested action. This output may comprise, for example, the signed data, and/or encrypted or decrypted keys. The OCSS Service Layer 126 later returns this output to OCSS Web Service 304 executing on the OCSS frontend 102. The OCSS Web Service 304 returns the generated output to OCSS client 306. If no output is available, the OCSS web service 304 returns an error code.

The OCSS 100 is secured with multiple layers of protection against unauthorized access and protection of private keys including those used to sign the data. Such protection includes:

User access is controlled by providing a hardware crypto token to the OCSS machine user 108B. The hardware crypto token contains a certificate and a corresponding private key and is associated with a username and password. The private key may be used to decrypt a locally stored user password or for direct authentication to the OCSS.

User authorization is role-based and very flexible, allowing different roles including administrator, manager, or user. Machine user 108B can only be assigned "user" role.

The OCSS backend 104 is deployed in a secure area behind second firewall 112 which allows access to the OCSS backend 104 only from the OCSS frontend 102 and in one embodiment, only on two web services ports, with access to a structured query language (SQL) server and the OCSS HSM 116 locked down.

Private keys are stored in OCSS HSM 116, and those keys cannot be retrieved in clear form. PKCS11 is an example of a standards-based HSM interface which may be used for code signing, encryption, and decryption operations, thus never exposing the private keys in clear form.

Critical operations are checked against authorization rules (stored in the OCSS database 114) and performed only if they are compliant with those rules.

Certificates are generated with the IP address of the OCSS machine user 108B as a unique user identifier in the CommonName attribute of each certificate. Optionally, a client is not permitted to be behind proxy settings, so that the OCSS machine user 108B IP address is the actual address and not modified as seen by the server. IP addresses may be blocked from accessing OCSS 100 configurations and entities based on the geographic location associated with that IP address.

Management of Users

As described above, there is a need to provide a framework that allows different organizations or companies to structure their data signing permission needs as they see fit or to safely permit data signing by other independent organizations that publish the data to their customers. This is accomplished by defining a hierarchical organization of a plurality of entities within the OCSS, and managing eligibility to designate users to access those entities via accounts granting different eligibility status, as further described below.

An account represents the relation between a company and an OCSS entity and all of the children of the OCSS entity. An account is one of two account types, including an owner account type, and a participant account type. Granting an account provides eligibility to grant permission of a user to access an OCSS entity (and those hierarchically below that entity), but not permission itself. The permission is instead granted to the eligible user. A company may have multiple accounts for different OCSS entities, as further discussed below.

The top level OCSS entity (the application platform entity discussed below) can be owned by just one company through an owner account. This is enforced by the OCSS administrator granting an owner account to only one company. However, a company may have a participant account on the two top OCSS entity levels (the application platform entity and the project entity). This structure allows different OCSS entities to be accessible by multiple companies by the granting of the particular type of account (owner or participant).

Only users from an owner account can be assigned as a manager, and only users whose company has an account (either an owner account or a participant account) can be granted permission to sign data to be installed on devices associated with an entity associated with that account.

Figure 4:
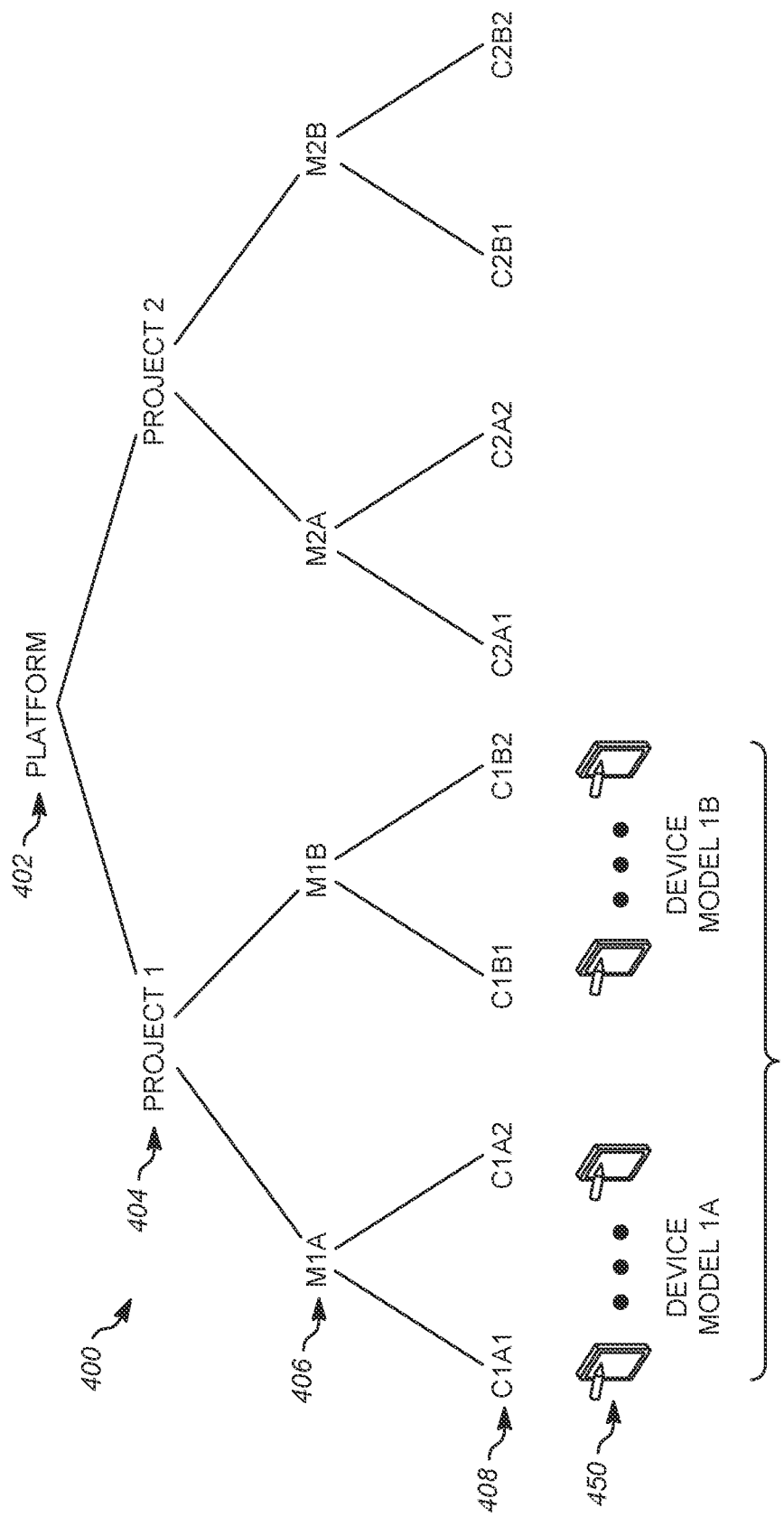
FIG. 4 is a diagram depicting a hierarchical organization (e.g. hierarchy) of a plurality of entities associated with data signing operations.

FIG. 4 is a diagram depicting a hierarchical organization (e.g. hierarchy 400) of a plurality of entities associated with data signing operations discussed above. The hierarchy 400 of entities includes, in decreasing hierarchical order, an application platform entity 402, at least one project entity 404 for each application platform entity 402, at least one model entity 406 for each project entity 404 and at least one configuration entity 408 for each model entity.

The application platform entity 402 may be evidenced by a corporate entity that manufactures or produces a plurality of devices 450, such as the assignee of this patent, COMMSCOPE, INC. A platform entity is defined as the highest hierarchical entity that organizes the code signing metadata/information for the fielded devices 450.

The project entity 404 typically comprises a family of devices 460 produced by the application platform entity 402. For example, the corporate entity COMMSCOPE may produce a first family of devices 460 such as set top boxes (STBs) for receiving satellite broadcasts (one project entity) and another family of devices 460 such as STBs for receiving cable broadcasts. Familial or group bounds can be defined as desired, but are typically defined to include products with analogous or similar functional requirements or functional architectures. For example, the project entity may be defined according to the functionality or source of the chip used in the devices 450—for example, those that use one particular digital telecommunication processing chip family belonging to one project and another digital telecommunication processing chip family in another project entity.

The model entity 406 can represent the particular models of the devices 450, for example models of satellite STBs and cable STBs. In the context of data signing, the model designation defines the how the signed data is to be installed on the devices 450 associated with the model entity 406. For example, a particular model of satellite STB may use a different technique for installing new data or code than a different model of the satellite STB. In the context of signing, the configuration entity defines the data to be installed on the devices 450.

For example, the satellite STB of the aforementioned example may include bootloader code (code that executes upon a system reboot that uploads and executes code and scripts), as well as application code. The one configuration entity may represent bootloader code, while a different configuration entity represents the application code.

Figure 5:
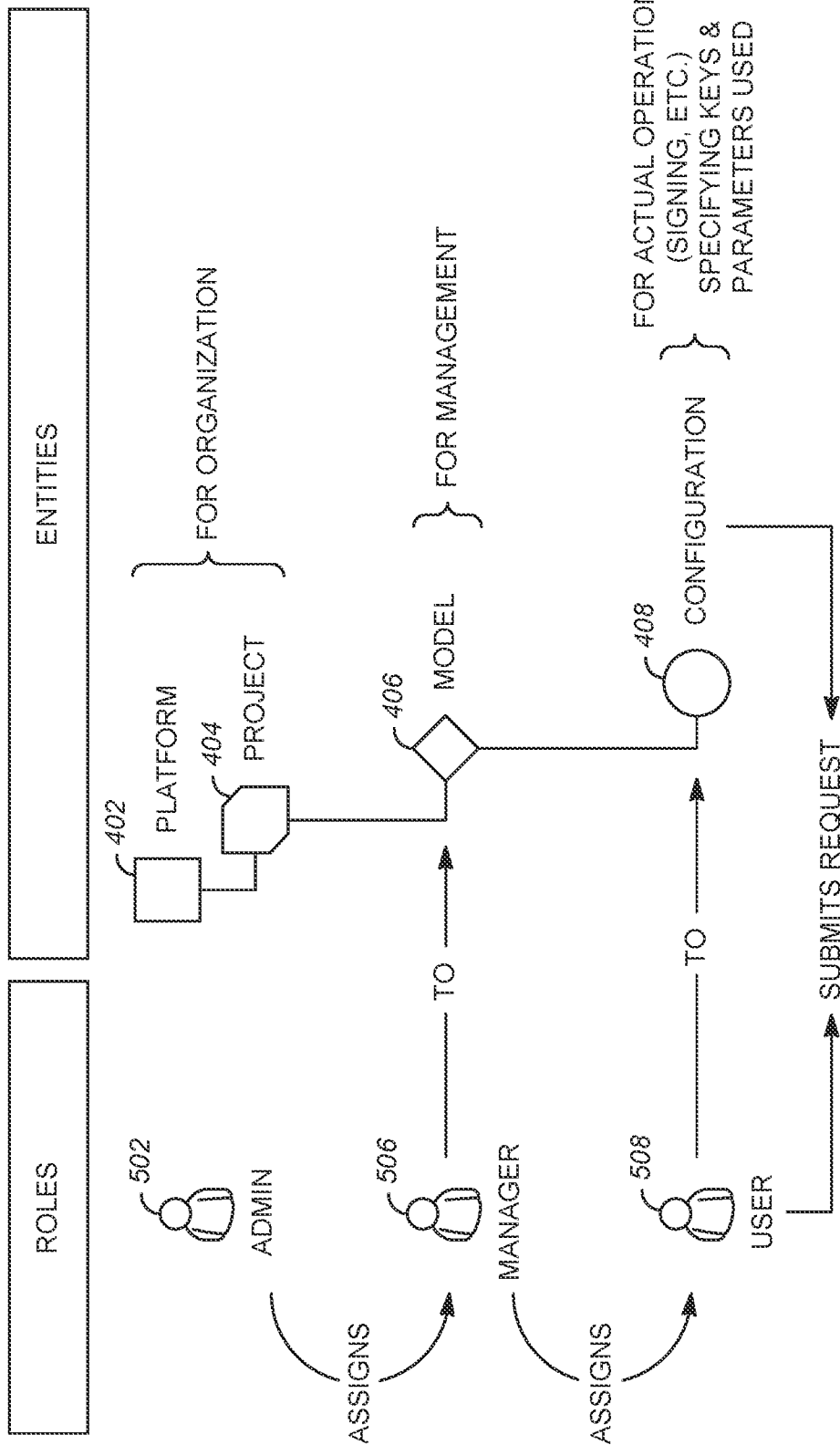
FIG. 5 is a diagram depicting the hierarchical organization and the user roles associated with those entities.

FIG. 5 is a diagram depicting the hierarchy 400 and the roles associated with those entities. An administrator 502 of the OCSS 100 is identified, and that administrator 502 is authorized to define the hierarchy of the entities in decreasing order, an application platform entity, at least one project entity for each application platform entity, at least one model entity for each project entity, and at least one configuration entity for each model entity. The administrator 502 is also authorized to access and authorize access to any of the entities 402-408 and may also assign a manager role 506 to another individual to manage a particular model entity 406. This individual (hereinafter alternatively referred to as the manager 506 of the model entity 406) is thus a person having the manager role 506 with respect to the associated model entity 406. This manager 506 is authorized to designate or assign user roles 508 to particular individuals for a particular configuration entity 408. This individual (herein alternatively referred to as a user 508 of a particular configuration entity 408) is thus a person having a user role 508 with respect to an associated configuration entity 408. Importantly, managers 506 may not add users (this can be accomplished only by the OCSS administrator), but authorize users to perform certain roles.

The configuration entity 408 holds information regarding the specific code signing operation such as signing keys, signature algorithm, file format, and other security parameters. Managers 506 are normally defined to have access to this configuration information for all the configurations under the manager's managed entity (model 406). Users who has access to a configuration entity 408 can use it to perform the code signing activity according to the specified information/parameter but normally do not see the detailed information (e.g. keys, algorithms, and the like) itself.

Code Signing System Elements

Figure 6:
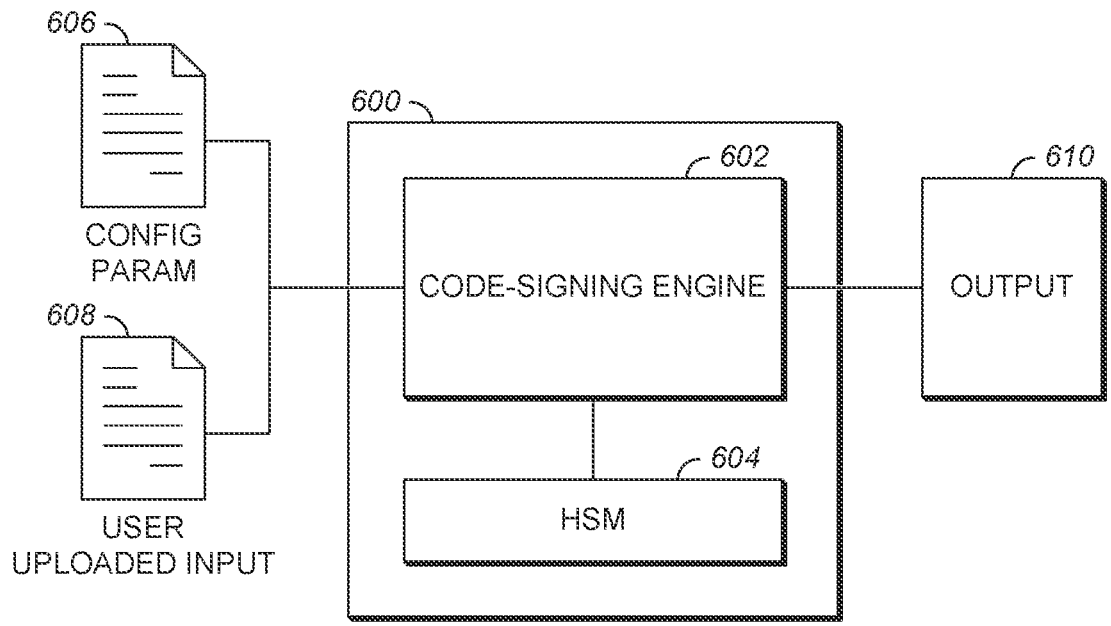
FIG. 6 is a diagram of elements of a general purpose machine-to-machine code signing system.

FIG. 6 is a diagram of elements of a general purpose machine-to-machine code signing system 600. The system 600 comprises a code signing engine 602. In one embodiment, the code signing engine 602 has built in code signing operations implemented as "operation types." Operation types may include proprietary or standard crypto operations such as PKCS #1, PKCS #7. The system 600 may also include an HSM 604. Any cryptographic keys for signing and encryption are preferably protected in the HSM 604 accessible by the Code Signing Engine 602 via an application programming interface (API).

Before a client can use the code signing system 600, a "configuration" is defined (typically by a system administrator described above). The configuration defines the operation type, the key, and any standard parameters defined by the operation type. For example, the PKCS #1 operation type may require am RSA signing key, and standard parameters may include the Endianness of the operation and what hashing algorithm to use (for example, SHA1 or SHA256).

Once the configuration is defined and authorized to a client, the client can sign code by submitting a request with a pointer to the configuration and the input code image to the system. The code signing engine 602 accepts the configuration parameters 606 and the user uploaded input data to be signed 608, and executes the code implemented for that operation type over the configuration parameters and input image in the request, to create the final output image 610 to return to the client.

There are different ways to organize signing configurations. One such way is to use a hierarchy structure such as the one illustrated in FIG. 5, discussed above. The configurations are organized in a hierarchy structure starting from Platform 402, followed by project 404, model 406 and then the actual configurations 408. Users of the code signing system may be assigned different roles. In this example, the Administrator 502 is responsible for defining the various entities in the system and assigning users 508 as manager 506 to models 406. The managers 506 are responsible for assigning users 508 (machine clients in this case) to the actual signing configurations. And finally, machine client 108B can submit signing requests to authorized configurations to perform signing operations.

Figure 7:
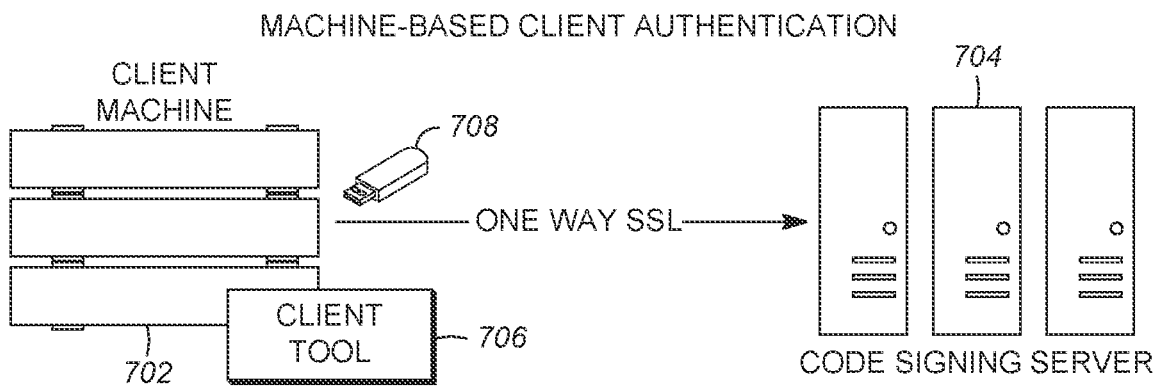
FIG. 7 is a diagram illustrating the use of a client tool and a code signing system for use in signing software images and other data.

FIG. 7 is a diagram illustrating the use of a client tool 706 and a code signing system 704 for use in signing software images and/or other data. The client tool 706 is implemented to execute on a client machine 702 which communicates with the OCSS 100 over a communication channel. The communication between the client machine 702 and the OCSS 100 may be implemented with the TLS (Transport Layer Security) protocol for communications security. TLS is a successor technology to SSL (Secure Sockets Layer). In informal usage, it is common for SSL to be used as an alternative name for TLS. Mutual authentication may be achieved wherein the client machine 702 authenticates the OCSS 100 based on the server's certificate, and the client machine 702 is authenticated to the OCSS 100 via message signature generated using a unique private key and certificate loaded in a secure device such as a universal serial bus (USB) Crypto Token 708 previously issued for use with the client machine 702. Alternatively, a mutually-authenticated TLS connection can be set up where in each sides uses its certificate to authenticate itself to the other during the TLS connection establishment.

The client tool 706 is capable of submitting code signing request to the OCSS 100, providing information comprising a pointer to the code signing configuration (stored at the OCSS 100), input image, and any optional parameters required for the operation to be performed. The interface to the OCSS 100 may be implemented using any protocols, one common choice is the SOAP (Simple Object Access Protocol), which is an Extensible Markup Language (XML) based protocol over HTTPS. The message is signed by the unique private key in the USB Crypto Token 708. The OCSS 100 verifies the message signature to make sure it is authenticated. The OCSS 100 then verifies that the client machine 702 machine (identified by the token's certificate) is authorized for the requested signing configuration. If so, the OCSS 100 processes the code signing request and return the result to the client machine 702.

As described above, there are typically some processing steps to be performed before and after the signature is generated by the OCSS 100. These processing steps may be implemented on the OCSS 100 side, in which case the full software image must be uploaded to the OCSS 100 for processing. When the software image size is large, this process is time consuming and the transmission may be interrupted if the communication link is unreliable.

Two Step Data Signing

Figure 8A:
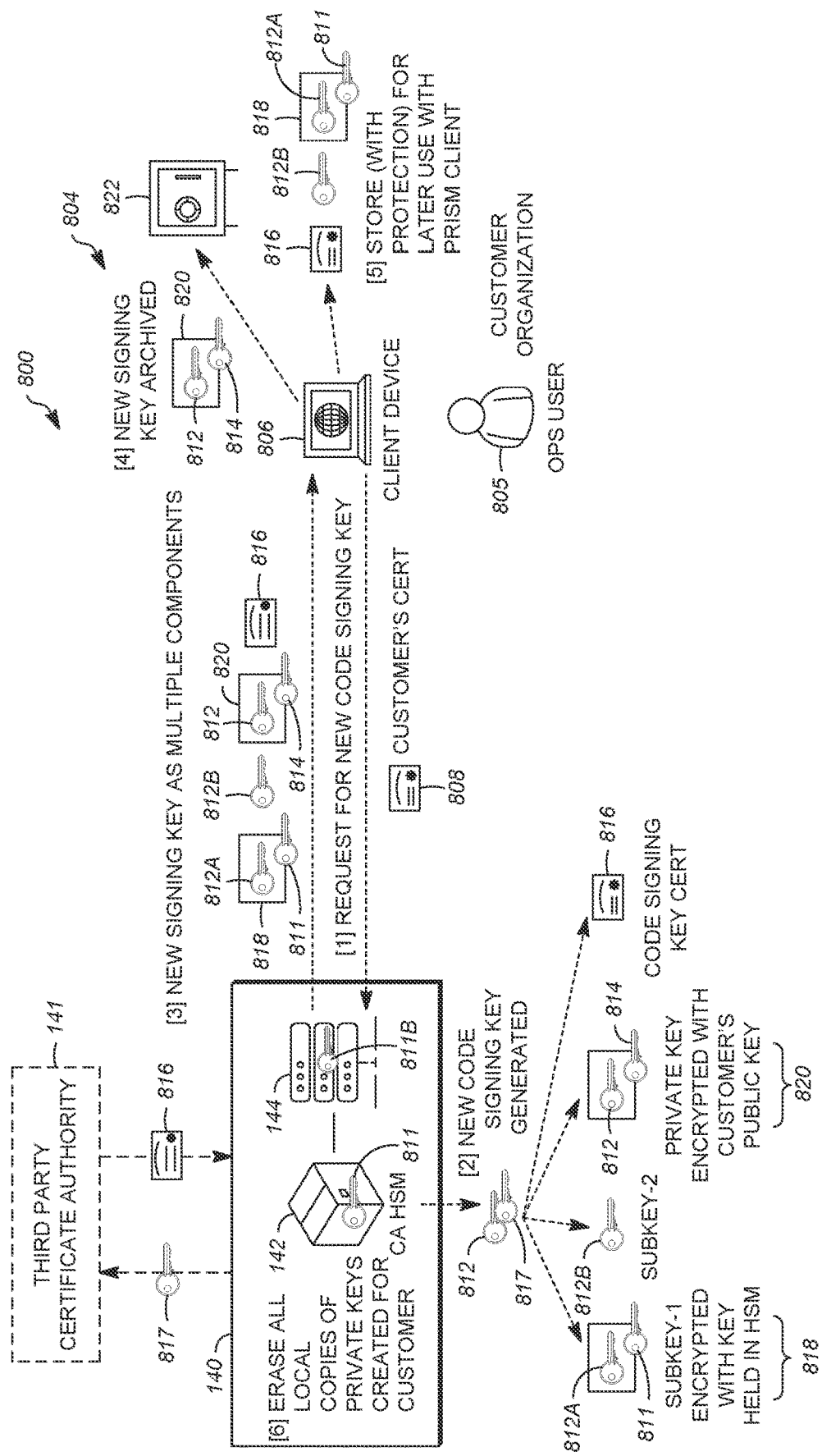
FIGS. 8A and 8B are diagrams illustrating of one embodiment of a multiple-step data signing system.
Figure 8B:
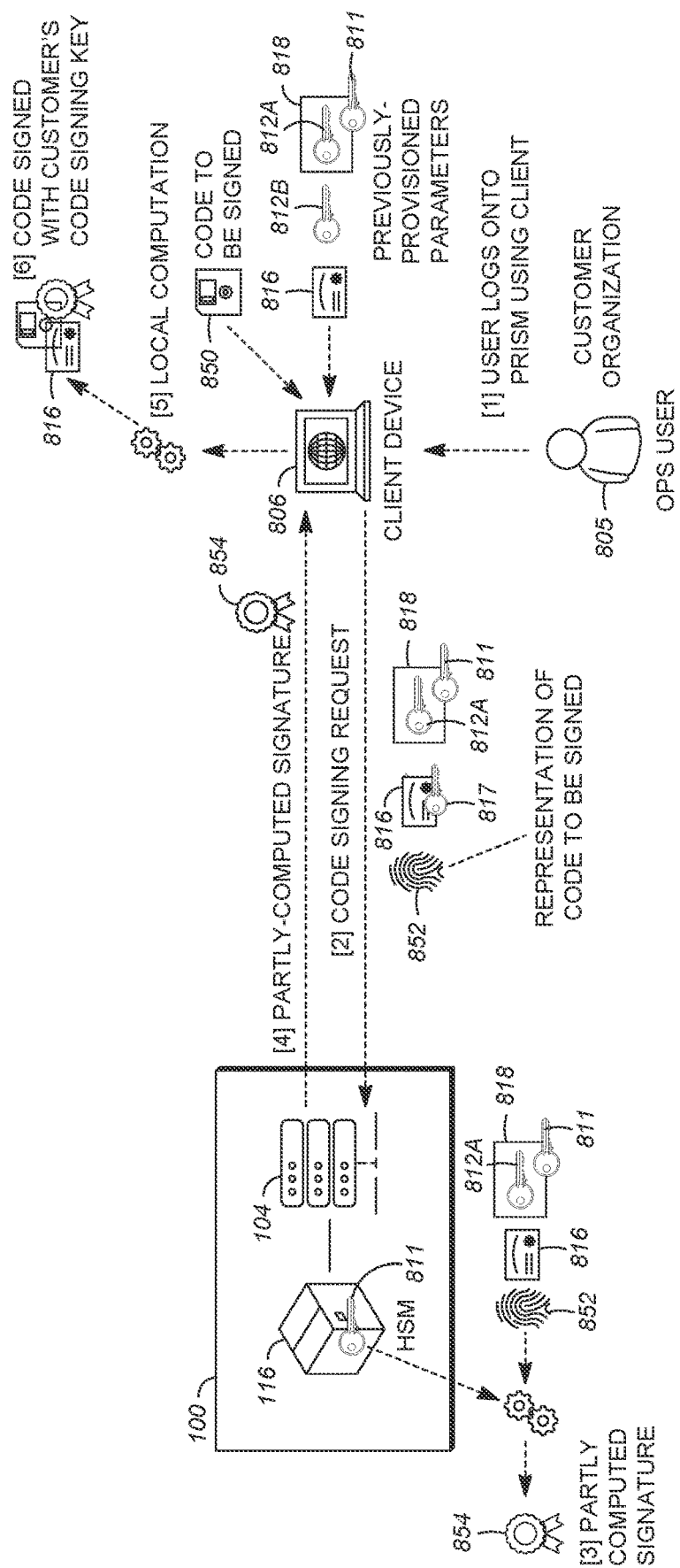
Figure 9:
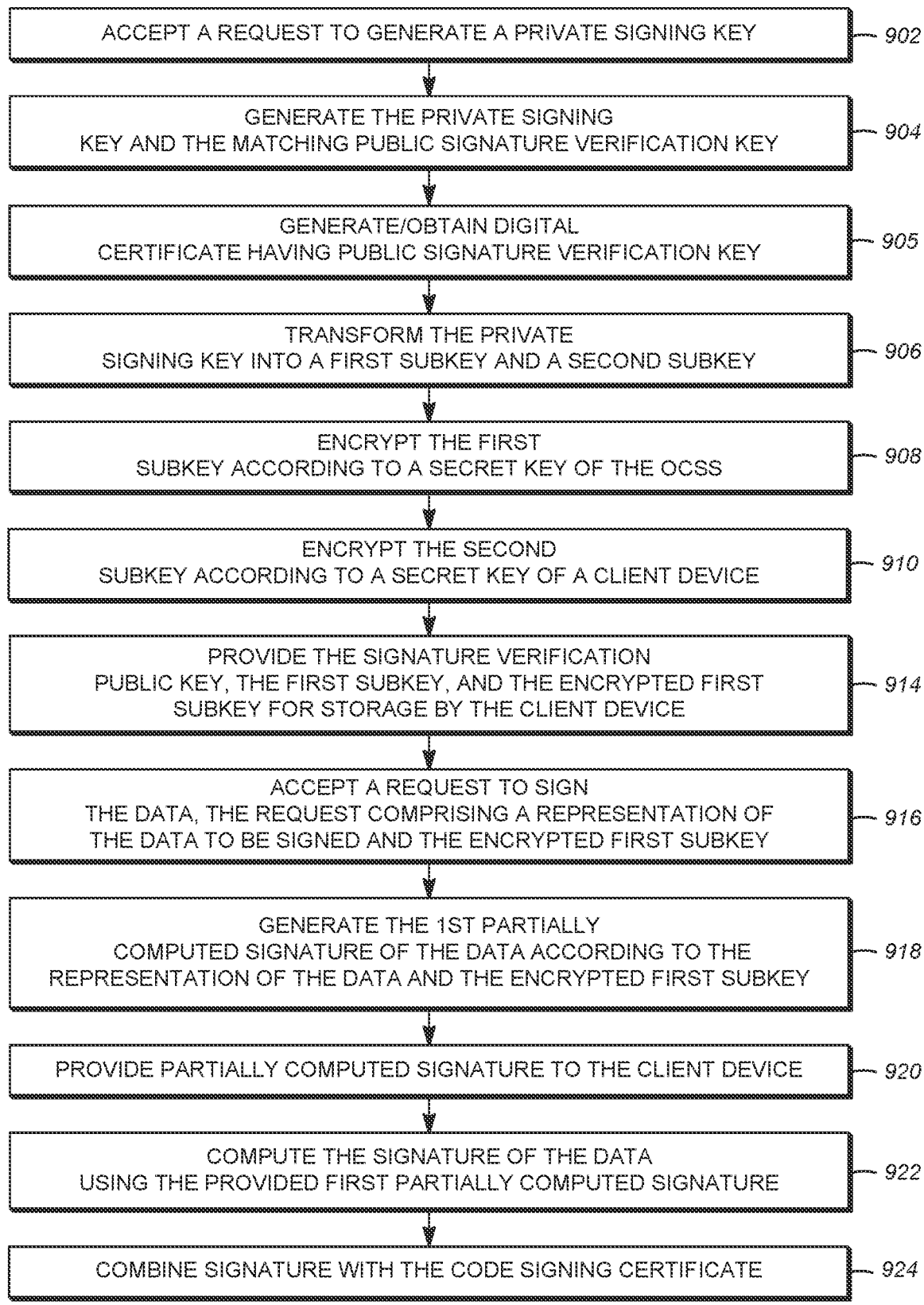
FIG. 9 is a diagram illustrating exemplary operations that can be used to implement multi-step data signing.

FIGS. 8A and 8B are diagrams illustrating of one embodiment of the use of a multi-step data signing system (MSDSS) 800. The MSDSS 800 comprises a Certificate Authority 140 communicatively coupled to a client device 806 and can implement the firewall structure as illustrated and described above. The Certificate Authority 140 and the PKI client 804 communicate to request signing keys and digital certificates. In the illustrated embodiment, the Certificate Authority 140 comprises a processor/server 144 and a communicatively coupled Certificate Authority hardware security module (CA HSM) 142 that stores one or more secret keys. FIGS. 8A and 8B will be discussed in conjunction with FIG. 9, which is a diagram illustrating exemplary operations that can be used to implement multi-step data signing.

Turning first to FIG. 8A, the process begins when a user 805, such as a local administrator or operations user of a customer organization, generates a request for a new code signing key as shown in step [1]. The request is preferably secured by being digitally signed and includes the client's pre-provisioned digital certificate 808, which includes a public key 814 of the user 805. Other known techniques for providing communications security and user authentication may also be used. This pre-provisioned customer's certificate 808 is used to authenticate the request for a code signing key, and is distinct and unrelated to the code signing key digital certificate 816 that is later issued by the Certificate Authority 140 in response to the request for a new code signing key and used for code signing. The request is transmitted from the client device 806 to the Certificate Authority 140. The Certificate Authority 140 accepts the request, as shown in block 902. The Certificate Authority 140 then generates a new private data or code signing key 812 (hereinafter alternately referred to as data signing key) and the matching signature verification public key 817, as shown in step [2] and block 904.

The public key 817 may optionally be returned to the client device 806 in a form of a code signing digital certificate 816. The code signing digital certificate 816 may be generated by the CA 140 directly or using a third-party Certificate Authority 141 that provides digital certificate-issuing services to a broad range of customers. If a third-party Certificate Authority 141 is used, the Certificate Authority 140 can optionally submit the signature verification public key 817 to the third-party Certificate Authority 141 for signing and receive a code signing digital certificate 816 having the signed public key 817 in return. The private signing key 812 is then transformed into a first subkey (s1) 812A and a second subkey (s2) 812B, as shown in block 906.

Returning to FIGS. 8A and 9, block 908 encrypts the first subkey 812A according to a secret key 811 of the OCSS to produce an encrypted first subkey $E_{Ks}[s1]$ 818. In the illustrated embodiment, the first subkey is encrypted with a secret key 811 held in a CA HSM 142 communicatively coupled to the Certificate Authority 140. Alternatively, s1 may be encrypted using a public key (e.g., RSA public key) 811b which corresponds to the secret private key 811 stored in the HSM 116. If the public key 811b is utilized, it is not secret and need not be stored in an HSM 116. Encrypting the first subkey 812A allows the first subkey 812A to be provided to the client device 806 so that it can be later sent to the OCSS 100 with the data signing request. This frees the Certificate Authority 140 from forwarding the first subkey 812A to the OCSS 100 and also frees the OCSS 100 from the need to store the first subkey 812A associatively with the client device or returned public key 817. In other embodiments, the first subkey can be forwarded from Certificate Authority 140 to OCSS 100 and then stored in a memory available to the OCSS 100 (along with information associating that first subkey s1 with the public key 817 and optional code signing digital certificate 816), and later retrieved and used by the OCSS 100 when the request to sign the data is received from the client device 806. In this embodiment, the request to sign data includes an identifier (ID) of the public key 817 (for example, its hash value) used for signature verification, but need not include the encrypted first subkey $E_{Ks}[s1]$ 818. Instead, the OCSS 100 uses the public key ID to retrieve the appropriate first subkey 812A.

Block 910 illustrates the optional step of encrypting the second subkey (s2) 812B according to a secret key of the client device 806. Typically, communications between the OCSS 100 and the client device 806 are afforded confidentiality protection by the underlying communication protocol used (e.g. TLS, HTTPS (HTTP conducted over TLS)). When such confidentiality protection is provided by the underlying communication protocol, the encryption in block 910 is not strictly necessary, but such encryption does provide for additional security. The client device 806 can then decrypt the encrypted second subkey E[s2] using the secret key to recover the second subkey when needed.

Another optional step is to encrypt the generated private signing key 812 according to the customer's public key 814 included with the client's digital certificate 808 provided with the request for the new code signing key. As described below, this encrypted copy of private signing key 812 may be later provided to the client device 806 for archival in a secure storage 822. Preferably, the archival of the private signing key 812 is managed in such a way that client device 806 normally has no access to the signing key 812, nor the ability to exercise it in performing computation. Such archival storage has the advantage of allowing a customer to implement their own single-step/conventional code signing without the use of OCSS 100—in the case that OCSS 100 becomes unavailable or a business contract between the customer and the owner of the OCSS 100 is terminated.

In block 914, signing key components, including the encrypted first subkey ($E_{Ks}[s1]$) 818, the second subkey (s2) 812B (optionally encrypted), and the signature verification public key (in the code signing digital certificate 816), are provided for storage in the client device 806. This is also illustrated in step [3] of FIG. 8A. Optionally, the generated private signing key 812 is encrypted with the client's public key 814 provided in the client's digital certificate 808 is also provided to the client device 806 as data 820 for archival in secure storage 822, as shown in step [3] of FIG. 8A.

Referring to FIG. 8B, in step [1], a user 805 logs into the OCSS 100 using the client device 806. The client device 806, optionally facilitated by the user 805, retrieves the previously provisioned code signing certificate 816 having the signature verification public key 817 and the encrypted first subkey ($E_{Ks}[s1]$) 818. The client device 806 also retrieves a representation 852 of the data (illustrated as a fingerprint, but may be any representation of the data) to be signed and generates a data signing request.

The data to be signed may include software code or a software image. Alternatively or in addition to the software code, the data to be signed may comprise a message having a set of debugging permissions that are used to debug code and a device identifier that is used to unlock a specific device to permit debugging functionality, or other configuration parameters. For example, the data may comprise a concatenation of the foregoing data elements such as [digest of data|permissions|deviceID].

The data signing request comprises the representation of the data 850 and the encrypted first subkey ($E_{Ks}[s1]$) 818. The data signing request may also include the code signing digital certificate 816 having the signature verification public key 817. This code signing digital certificate 816 may be included with the partly-computed signature 854 computed by the OCSS 100 and returned to the client device 806 as discussed further below.

In the embodiment illustrated in FIG. 8B, the representation of the data to be signed is a digest 852 of the data 850. In other embodiments, the representation of the data 850 to be signed is the data 850 itself, in which case, the client device 806 need not generate the digest 852.

In block 916, the OCSS 100 accepts the data signing request. In step 918, the OCSS 100 generates the partially computed signature $sign_P$ 854 of the data according to the representation 852 of the data and the encrypted first subkey ($E_{Ks}[s1]$) 818. This is also illustrated in step [3] of FIG. 8B. This is accomplished by using the secret key 811 of the OCSS 100 to decrypt the encrypted first subkey ($E_{Ks}[s1]$) 818 to recover the first subkey (s1), and using the first subkey to generate the partially computed signature $sign_P$ 854 of the representation 852 of the data. In some embodiments, the generation of the partially computed signature $sign_P$ 854 additionally includes augmenting the representation of the data 854 by combining it (i.e. the representation) with additional data, to produce an augmented representation of the data. Such additional data may include configuration parameters and may be provided by the OCSS 100. In such embodiments, the augmented representation of the data is used in place of the (unaugmented) representation 852 in generating the partially computed signature 854.

In block 920, the OCSS 100 provides the partially computed signature $sign_P$ 854 of the data to the client device and may optionally include the code signing certificate 816 that is packaged together into a formatted data structure, such as a PKCS #7 SignedData structure. This is also shown in step [4] of FIG. 8B. In block 922, the client device 806 computes the complete signature of the data using the provided partially computed signature 854 received from the OCSS 100 along with the second subkey s2 812B held by the client device 806. This is also shown in step [5]. Note that when OCSS 100 returns the code signing certificate 816 along with the partially computed signature 854, the complete signature is computed only over the partially computed signature 854. The code signing certificate 816 is left as is in the returned data structure and is not utilized during this final computation step [5]. The computed signature can be combined with the code signing certificate 816, as shown in block 924.

In one embodiment, the aforementioned code signing certificate 816 is not sent in steps [2] and [4] of FIG. 8B, and is instead attached to the complete signature of the data locally by the client device 806 to generate a final signed data image 854, as shown in step [6]. The signature verification public key 817 included in this code signing digital certificate 816 can be installed in the client device 806 or other software platform, and used to validate the signatures generated with the first subkey s1 812A and the second subkey s2 812B.

In one embodiment, the request for the signing key is accepted from an administrator client device (e.g. a client device utilized by a member of a client organization designated as an administrator), and the partially computed signature is requested and returned to another user client device 806 that does not have administrator privileges.

Selected Embodiments

Different cryptographic paradigms may be used to sign the data, and the selection of such paradigms determines the specific operations needed to transform the signing key into the first subkey and the second subkey and to compute the partially computed signature. Further, the data signing (private) key can be transformed (or split) into two keys in a number of ways, including additive splitting and multiplicative splitting. Below, we discuss an embodiment wherein the data is signed according to an RSA (Rivest-Shamir-Adleman) private key having a private exponent d, and consider both additive and multiplicative splitting.

RSA with Additive Splitting

In this embodiment, the data is signed according to an RSA private key. In this embodiment, the data signing key is represented by a private key exponent d. In the case of additive splitting, the signing key is transformed into the first subkey and the second subkey by additively splitting the private key exponent d into s1 and s2 such that s1+s2≡d (mod φ(n)), wherein n is the RSA modulus and φ(n) is the Euler's totient function of the RSA modulus n, and ≡ denotes modular congruence. That is, φ(n)=(p−1)(q−1) wherein n=pq, and p and q are two distinct randomly chosen prime numbers. In this instance, the partially computed signature $\text{sign}_P$ 854 is determined as:

$$\text{sign}_P = h(m)^{s1} \bmod n \quad \text{(Equation 1)}$$

where h(m) is a digest of the data and s1 is the first subkey. Further, the completely computed signature s is computed as:

$$s = (\text{sign}_P \cdot h(m)^{s2} \bmod n) \bmod n \quad \text{(Equation 2)}$$

wherein s2 is the second subkey.

RSA with Multiplicative Splitting

In this embodiment, the data is also signed according to an RSA key represented by a private key exponent d, however, the signing key is transformed by multiplicatively splitting the private key exponent d into s1 and s2, such that s1·s2≡d (mod φ(n)), where n is the RSA modulus and φ(n) is the Euler's totient function of n, and ≡ denotes the modular congruence relation.

In this instance, the partially computed signature $\text{sign}_P$ 854 is determined as:

$$\text{sign}_P = h(m)^{s1} \bmod n \quad \text{(Equation 3)}$$

where h(m) is a digest of the data and s1 is the first subkey. Further, the completely computed signature s is computed as:

$$s = (\text{sign}_P)^{s2} \bmod n \quad \text{(Equation 4)}$$

wherein s2 is the second subkey.

Hardware Environment

Figure 10:
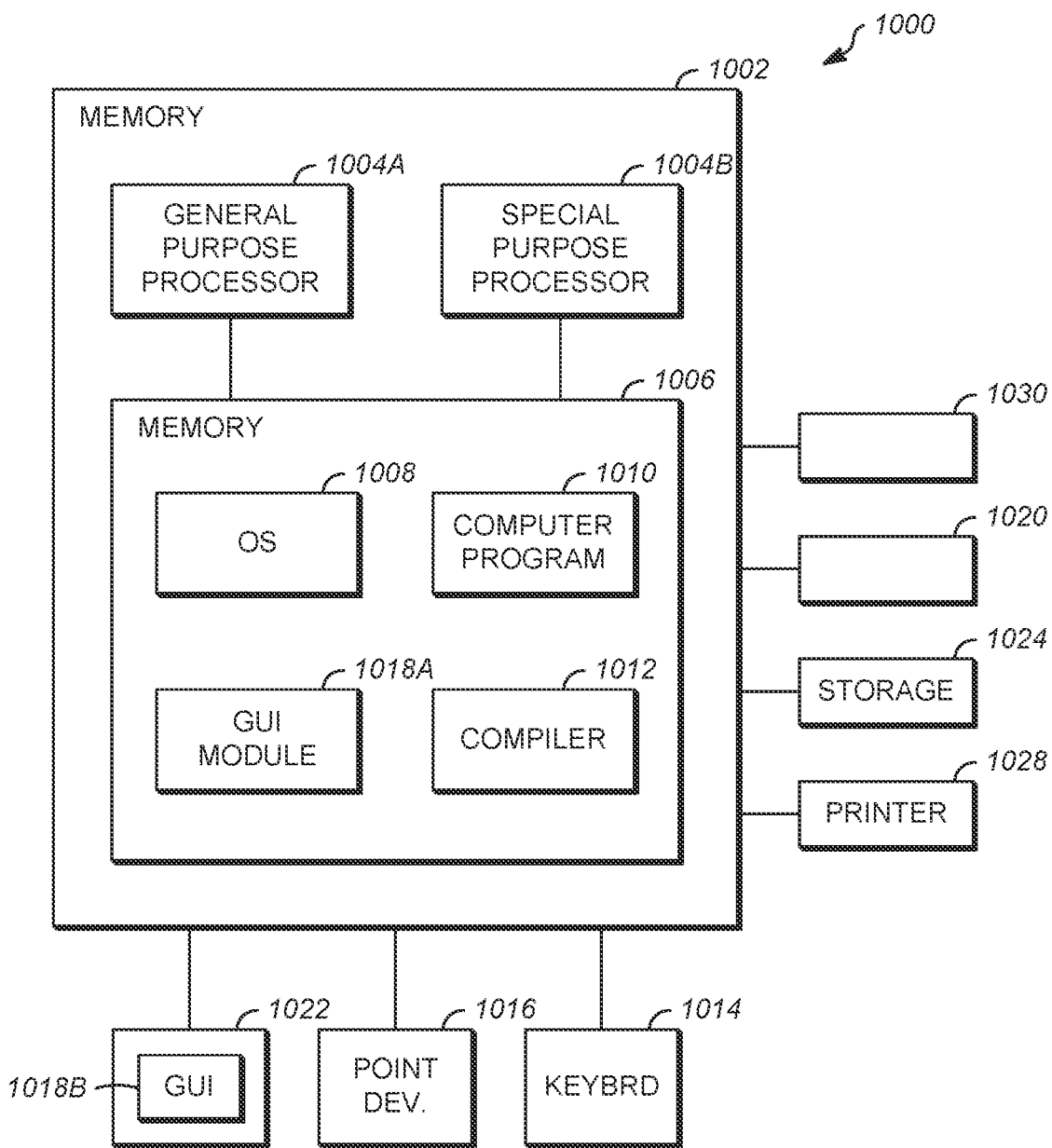
FIG. 10 is a diagram illustrating an exemplary computer system that could be used to implement elements of the system.

FIG. 10 illustrates an exemplary computer system 1000 that could be used to implement processing elements of the above disclosure, including the OCSS 100, the HSM 116 and CA HSM 142, the third-party Certificate Authority 141, and the client device 806. The computer 1002 comprises a processor 1004 and a memory, such as random access memory (RAM) 1006. The computer 1002 is operatively coupled to a display 1022, which presents images such as windows to the user on a graphical user interface 1018B. The computer 1002 may be coupled to other devices, such as a keyboard 1014, a mouse device 1016, a printer 1028, etc. Of course, those skilled in the art will recognize that any combination of the above components, or any number of different components, peripherals, and other devices, may be used with the computer 1002.

Generally, the computer 1002 operates under control of an operating system 1008 stored in the memory 1006, and interfaces with the user to accept inputs and commands and to present results through a graphical user interface (GUI) module 1018A. Although the GUI module 1018B is depicted as a separate module, the instructions performing the GUI functions can be resident or distributed in the operating system 1008, the computer program 1010, or implemented with special purpose memory and processors. The computer 1002 also implements a compiler 1012 which allows an application program 1010 written in a programming language such as COBOL, C++, FORTRAN, or other language to be translated into processor 1004 readable code. After completion, the application 1010 accesses and manipulates data stored in the memory 1006 of the computer 1002 using the relationships and logic that was generated using the compiler 1012. The computer 1002 also optionally comprises an external communication device such as a modem, satellite link, Ethernet card, or other device for communicating with other computers.

In one embodiment, instructions implementing the operating system 1008, the computer program 1010, and the compiler 1012 are tangibly embodied in a computer-readable medium, e.g., data storage device 1020, which could include one or more fixed or removable data storage devices, such as a zip drive, floppy disc drive 1024, hard drive, CD-ROM drive, tape drive, etc. Further, the operating system 1008 and the computer program 1010 are comprised of instructions which, when read and executed by the computer 1002, causes the computer 1002 to perform the operations herein described. Computer program 1010 and/or operating instructions may also be tangibly embodied in memory 1006 and/or data communications devices 1030, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure. The foregoing description of the preferred embodiment has been presented for the purposes of illustration and description.

One embodiment discloses a method comprising: generating a key pair, the key pair including a data signing key and a signature verification public key; transforming the data signing key into a first subkey and a second subkey; encrypting the first subkey according to a secret key of an online data signing system (ODSS); providing the signature verification public key, the encrypted first subkey, and the second subkey for storage in a client device; accepting a request to sign a data, the request comprising a representation of the data to be signed and the encrypted first subkey; generating a partially computed signature of the data according to the representation of the data and the encrypted first subkey; and providing the partially computed signature of the data to the client device.

Other embodiments of the foregoing method are disclosed, including:

Any one or more of the foregoing methods, further comprising the device computing a signature of the data using the provided partially computed signature.

Any one or more of the foregoing methods, further comprising encrypting the second subkey according to a secret key of a client device and providing the signature verification public key, the encrypted first subkey, and the encrypted second subkey for storage in the client device.

Any one or more of the foregoing methods, wherein the signature verification public key is returned to the client device as a digital certificate.

Any one or more of the foregoing methods, further comprising: transmitting the signature verification public key to a third party certificate authority; and receiving the digital certificate from the third party certificate authority.

Any one or more of the foregoing methods, wherein the digital certificate is attached to the signature of the data to generate a final signed data image.

Any one or more of the foregoing methods, further comprising: encrypting the data signing key; and providing the encrypted data signing key to the client device for archival.

Any one or more of the foregoing methods, wherein generating the partially computed signature of the data according to the representation and the encrypted first subkey comprises: decrypting the encrypted first subkey according to the secret key to recover the first subkey; and generating the partially computed signature of the data according to the representation and the first subkey.

Any one or more of the foregoing methods, wherein the method further comprises requesting the data signing key; the request for data signing key is accepted from an administrator client device; and the request to sign the data is accepted from a user client device.

Any one or more of the foregoing methods, wherein the representation of the data is selected from a group comprising: the data; and a digest of the data.

Any one or more of the foregoing methods, wherein the data comprises one or more of a group, comprising: software code; and a message having a set of debugging permissions and a device identifier for unlocking a specific device for debugging.

Any one or more of the foregoing methods, wherein generating a partially computed signature comprises combining the representation of the data with additional data provided by the ODSS, to produce an augmented representation of the data; and generating the partially computed signature according to the augmented representation of the data and the encrypted first subkey.

Any one or more of the foregoing methods, wherein the key pair is an RSA (Rivest-Shamir-Adleman) key pair; the data signing key has a private exponent d; and transforming the data signing key into a first subkey and a second subkey comprises splitting the private key exponent d into s1 and s2 such that $s1+s2=d \pmod{p(n)}$, where n is the RSA modulus and $p(n)$ is the Euler's totient function of n.

Any one or more of the foregoing methods, wherein: the partially computed signature is generated as $\text{sign}_P = h(m)^{s1} \bmod n$, wherein $h(m)$ is a digest of the data and s1 is the first subkey; and the method further comprises the device computing a completely computed signature s according to $s = (\text{sign}_P \cdot (h(m)^{s2} \bmod n)) \bmod n$, where s2 is the second subkey.

Any one or more of the foregoing methods, wherein: the key pair is an RSA key pair; the data signing key has a private exponent d; and transforming the data signing key into a first subkey and a second subkey comprises multiplicatively splitting the private key exponent d into s1 and s2, such that $s1 \cdot s2 \equiv d \pmod{p(n)}$, where n is the RSA modulus and $p(n)$ is the Euler's totient function of n.

Any one or more of the foregoing methods, wherein the partially computed signature is generated as $sp = h(m)^{s1} \bmod n$, where $h(m)$ is a digest of the data; and s1 is the first subkey; and the method further comprises the client device computing a completely computed signature s, according to $s = (\text{sign}_P^{s2}) \bmod n$, wherein s2 is the second subkey.

Any one or more of the foregoing methods, further comprising installing the signature verification public key into a software platform for validating signatures generated with the first subkey and the second subkey.

Any one or more of the foregoing methods, wherein providing the signature verification public key, the encrypted first subkey, and the second subkey to a client device comprises: encrypting the second subkey according to a secret key possessed by the client device; and providing the encrypted second subkey to the client device; the method further comprises: the client device decrypting the encrypted second subkey with the secret key possessed by the client device.

Another embodiment is evidenced by an apparatus, comprising: a processor and a memory, communicatively coupled to the processor, the memory storing processor instructions. The processor instructions comprise processor instructions for performing the operations described in the foregoing methods. These include for example, processor instructions for generating a key pair, the key pair including a data signing key and a signature verification public key; transforming the data signing key into a first subkey and a second subkey; encrypting the first subkey according to a secret key of an online data signing system (ODSS); providing the signature verification public key, the encrypted first subkey, and the second subkey for storage in a client device; accepting a request to sign data, the request comprising a representation of the data to be signed and the encrypted first subkey; generating a partially computed signature of the data according to the representation of the data and the encrypted first subkey; and providing the partially computed signature of the data to the client device.

The foregoing is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method, comprising:
   (a) generating a key pair, the key pair including a data signing key and a signature verification public key;
   (b) transforming the data signing key into a first subkey and a second subkey;
   (c) encrypting the first subkey according to a secret key of an online data signing system (ODSS);
   (d) providing the signature verification public key, the encrypted first subkey, and the second subkey to a client device;
   (e) accepting a request to sign data, the request comprising:
      (1) a representation of the data to be signed; and
      (2) the encrypted first subkey;
   (f) generating a partially computed signature of the data according to the representation of the data and the encrypted first subkey; and
   (g) providing the partially computed signature of the data to the client device.

2. The method of claim 1, further comprising the client device computing a signature of the data using the provided partially computed signature.

3. The method of claim 1, wherein the method further comprises encrypting the second subkey according to a secret key of a client device; and providing the signature verification public key, the encrypted first subkey, and the encrypted second subkey for storage in the client device.

4. The method of claim 1, wherein the signature verification public key is returned to the client device as a digital certificate.

5. The method of claim 4, further comprising transmitting the signature verification public key to a third party certificate authority and receiving the digital certificate from the third party certificate authority.

6. The method of claim 4, wherein the digital certificate is attached to the signature of the data to generate a final signed data image.

7. The method of claim 1, further comprising encrypting the data signing key and providing the encrypted data signing key to the client device for archival.

8. The method of claim 1, wherein generating the partially computed signature of the data according to the representation and the encrypted first subkey comprises decrypting the encrypted first subkey according to the secret key to recover the first subkey and generating the partially computed signature of the data according to the representation and the first subkey.

9. The method of claim 1, wherein:
(a) the method further comprises requesting the data signing key;
(b) the request for data signing key is accepted from an administrator client device; and
(c) the request to sign the data is accepted from a user client device.

10. The method of claim 1, wherein the representation of the data is selected from a group comprising the data and a digest of the data.

11. The method of claim 10, wherein the data comprises one or more of a group, comprising software code and a message having a set of debugging permissions and a device identifier for unlocking a specific device for debugging.

12. The method of claim 1, wherein generating a partially computed signature comprises combining the representation of the data with additional data provided by the ODSS, to produce an augmented representation of the data and generating the partially computed signature according to the augmented representation of the data and the encrypted first subkey.

13. The method of claim 1, wherein:
(a) the key pair is an RSA (Rivest-Shamir-Adleman) key pair;
(b) the data signing key has a private key exponent d; and
(c) transforming the data signing key into a first subkey and a second subkey comprises splitting the private key exponent d into s1 and s2 such that $s1+s2 \equiv d \pmod{\varphi(n)}$, where n is the RSA modulus and $\varphi(n)$ is the Euler's totient function of n.

14. The method of claim 13, wherein:
(a) the partially computed signature is generated as $\text{sign}_P = h(m)^{s1} \mod n$, wherein:
(1) h(m) is a digest of the data; and
(2) s1 is the first subkey;
(b) the method further comprises:
(1) the device computing a completely computed signature s according to $s = (\text{sign}_P \cdot (h(m)^{s2} \mod n)) \mod n$, where s2 is the second subkey.

15. The method of claim 1, wherein:
(a) the key pair is an RSA key pair;
(b) the data signing key has a private key exponent d; and
(c) transforming the data signing key into a first subkey and a second subkey comprises multiplicatively splitting the private key exponent d into s1 and s2, such that $s1 \cdot s2 \equiv d \pmod{\varphi(n)}$, where n is the RSA modulus and $\varphi(n)$ is the Euler's totient function of n.

16. The method of claim 15, wherein:
(a) the partially computed signature is generated as $\text{sp} = h(m)^{s1} \mod n$, where
(1) h(m) is a digest of the data; and
(2) s1 is the first subkey;
(b) the method further comprises:
(1) the client device computing a completely computed signature s, according to $s = (\text{sign}_P^{s2}) \mod n$, where s2 is the second subkey.

17. The method of claim 1, further comprising installing the signature verification public key into a software platform for validating signatures generated with the first subkey and the second subkey.

18. The method of claim 1, wherein:
(a) providing the signature verification public key, the encrypted first subkey, and the second subkey to a client device comprises:
(1) encrypting the second subkey according to a secret key possessed by the client device; and
(2) providing the encrypted second subkey to the client device;
(b) the method further comprises:
(1) the client device decrypting the encrypted second subkey with the secret key possessed by the client device.

19. An apparatus, comprising:
(a) a processor;
(b) a memory, communicatively coupled to the processor, the memory storing processor instructions comprising processor instructions for:
(1) generating a key pair, the key pair including a data signing key and a signature verification public key;
(2) transforming the data signing key into a first subkey and a second subkey;
(3) encrypting the first subkey according to a secret key of an online data signing system (ODSS);
(4) providing the signature verification public key, the encrypted first subkey, and the second subkey for storage in a client device;
(5) accepting a request to sign data, the request comprising:
(i) a representation of the data to be signed; and
(ii) the encrypted first subkey;
(6) generating a partially computed signature of the data according to the representation of the data and the encrypted first subkey; and
(7) providing the partially computed signature of the data to the client device.

20. An apparatus, comprising:
(a) means for generating a key pair, the key pair including a data signing key and a signature verification public key;
(b) means for transforming the data signing key into a first subkey and a second subkey;
(c) means for encrypting the first subkey according to a secret key of an online data signing system (ODSS);
(d) means for providing the signature verification public key, the encrypted first subkey, and the second subkey for storage in a client device;

(e) means for accepting a request to sign data, the request comprising:
  (1) a representation of the data to be signed; and
  (2) the encrypted first subkey;
(f) means for generating a partially computed signature of the data according to the representation of the data and the encrypted first subkey; and
(g) means for providing the partially computed signature of the data to the client device.

* * * * *